(12) United States Patent
Jung et al.

(10) Patent No.: US 10,920,014 B2
(45) Date of Patent: Feb. 16, 2021

(54) COMPOUNDS, COMPOSITIONS INCLUDING THE SAME, AND LAYERED STRUCTURES AND DEVICES PREPARED FROM THE COMPOSITIONS

(71) Applicant: SAMSUNG ELECTRONICS CO., LTD., Suwon-si (KR)

(72) Inventors: Won Cheol Jung, Seoul (KR); Byung Ha Park, Yongin-si (KR); Sung Hun Hong, Hwaseong-si (KR); Myong Jong Kwon, Suwon-si (KR); Ginam Kim, Seongnam-si (KR); Du Seop Yoon, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 206 days.

(21) Appl. No.: 16/029,104

(22) Filed: Jul. 6, 2018

(65) Prior Publication Data
US 2019/0010285 A1 Jan. 10, 2019

(30) Foreign Application Priority Data

Jul. 7, 2017 (KR) .......................... 10-2017-0086693

(51) Int. Cl.
*C08G 65/336* (2006.01)
*C08L 71/00* (2006.01)
(Continued)

(52) U.S. Cl.
CPC .......... *C08G 65/336* (2013.01); *C08G 65/007* (2013.01); *C08G 65/337* (2013.01);
(Continued)

(58) Field of Classification Search
CPC ................ C08G 65/007; C08G 65/336; C08G 65/3326; C08G 65/337; C09D 7/63;
(Continued)

(56) References Cited

U.S. PATENT DOCUMENTS 5,702,689 A 12/1997 Mondon-Rossignol et al.
6,337,135 B1 1/2002 Yamaguchi et al.
(Continued)

FOREIGN PATENT DOCUMENTS

CN 105884811 A 8/2016
EP 1300433 A2 4/2002
(Continued)

OTHER PUBLICATIONS

Greg Saunders et al: "Fundamentals and Properties of Size-Exclusion Chromatography Packings and Columns", LCGC,vol. 30, No. 4, Apr. 1, 2012 (Apr. 1, 2012), pp. 46-53, XP055595760.
(Continued)

*Primary Examiner* — Ramsey Zacharia
(74) *Attorney, Agent, or Firm* — Cantor Colburn LLP

(57) ABSTRACT

A composition including a perfluoropolyether compound, and an organic solvent configured to dissolve or disperse the perfluoropolyether compound, wherein the perfluoropolyether compound includes a first end and a second end facing each other and a perfluoropolyether moiety disposed between the first end and the second end, wherein the first end includes an organic group having 6 or more carbon atoms, and wherein the second end includes a hydrolysable silicon-containing residual group.

14 Claims, 7 Drawing Sheets

(51) Int. Cl.
*C09D 171/00* (2006.01)
*C08G 65/00* (2006.01)
*C08G 65/332* (2006.01)
*C08G 65/337* (2006.01)
*G06F 3/041* (2006.01)

(52) U.S. Cl.
CPC .......... *C08G 65/3326* (2013.01); *C08L 71/00*
(2013.01); *C09D 171/00* (2013.01); *G06F*
*3/041* (2013.01)

(58) Field of Classification Search
CPC ... C09D 7/41; C09D 7/42; C09D 7/43; C09D
7/44; C09D 7/45; C09D 7/46; C09D
7/47; C09D 7/48; C09D 171/00; C07F
7/18–7/1896
See application file for complete search history.

(56) References Cited

U.S. PATENT DOCUMENTS

| | | | |
|---|---|---|---|
| 8,324,314 | B2 | 12/2012 | Brown et al. |
| 2003/0139620 | A1 | 7/2003 | Yamaguchi et al. |
| 2009/0061039 | A1* | 3/2009 | Zhang .................... B82Y 10/00 425/436 R |
| 2012/0174823 | A1 | 7/2012 | Ham et al. |
| 2016/0340544 | A1* | 11/2016 | Katsukawa .......... C09D 183/12 |

FOREIGN PATENT DOCUMENTS

| | | |
|---|---|---|
| JP | 2010-077328 A | 4/2010 |
| JP | 2012-196868 A | 10/2012 |
| KR | 0535873 B1 | 12/2005 |
| KR | 0553314 B1 | 2/2006 |
| KR | 2011-0095321 A | 8/2011 |
| KR | 2014-0004035 A | 1/2014 |
| WO | 95-32174 | 11/1995 |
| WO | 2013-129691 A1 | 9/2013 |

OTHER PUBLICATIONS

Office Action dated Aug. 21, 2019, of the corresponding European Patent Application No. 18182115.8.

Extended European Search Report dated Oct. 18, 2018, issued for the corresponding European Patent Application No. 18182115.8-1107.

* cited by examiner

COMPOUNDS, COMPOSITIONS INCLUDING THE SAME, AND LAYERED STRUCTURES AND DEVICES PREPARED FROM THE COMPOSITIONS

CROSS-REFERENCE TO RELATED APPLICATION

This application claims priority to Korean Patent Application No. 10-2017-0086693 filed in the Korean Intellectual Property Office on Jul. 7, 2017, and all the benefits accruing therefrom under 35 U.S.C. § 119, the content of which is incorporated herein in its entirety by reference.

BACKGROUND

1. Field

Compounds, compositions including the same, and layered structures and devices prepared from the compositions are disclosed.

2. Description of the Related Art

Contaminations such as fingerprints on a surface of various products (e.g., a display device) may have adverse effects on their performance and/or appearance. Accordingly, development of a technology capable of preventing/suppressing the contaminations such as fingerprints on the surface of the products are desired.

SUMMARY

An embodiment provides a composition capable of providing a fingerprint invisibility coating.

Another embodiment provides a layered structure including the fingerprint invisibility coating.

Yet another embodiment provides a device including the layered structure.

Still another embodiment provides a perfluoropolyether compound included in the composition.

A composition according to an embodiment includes:

a perfluoropolyether compound; and an organic solvent configured to dissolve or disperse the perfluoropolyether compound, wherein the perfluoropolyether compound includes a first end and a second end facing each other and a perfluoropolyether moiety disposed between the first end and the second end, wherein the first end includes an organic group having 5 or more carbon atoms, and wherein the second end includes a hydrolysable silicon-containing residual group.

The first end may not include fluorine.

The first end may not include silicon.

The organic group may include a C5 to C60 substituted or unsubstituted aliphatic hydrocarbon group, a C6 to C60 substituted or unsubstituted aromatic hydrocarbon group, a C6 to C60 substituted or unsubstituted aliphatic hydrocarbon group wherein at least one methylene is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein, R is hydrogen or a C1 to C10 linear or branch alkyl group), imine (—NR—) (wherein, R is hydrogen or a C1 to C10 linear or branch alkyl group), or a combination thereof, a substituted or unsubstituted poly(alkylene oxide) residual group, a substituted or unsubstituted polyester residual group, or a combination thereof.

The organic group may include a C5 to C60 substituted or unsubstituted alkyl group, a C6 to C60 substituted or unsubstituted aryl group, a C7 to C60 substituted or unsubstituted arylalkyl group, a C6 to C60 substituted or unsubstituted alkenyl group, a polyester moiety including a repeating unit represented by —RC(=O)O— (wherein, R is a C2 to C10 substituted or unsubstituted alkylene group), or a combination thereof.

The second end may include —SiX$_3$ (wherein, X is the same or different and each independently includes a C1 to C3 alkyl group, a C1 to C3 alkoxy group, a hydroxy group, C1, or a combination thereof).

The perfluoropolyether compound may include a first linker between the first end and the perfluoropolyether moiety.

The first linker may include at least one moiety selected from a single bond, a C1 to C10 alkylene, —O—, —C(=O)—, —C(=O)O—, —OC(=O)O—, —NHC(=O)O—, —OC(=O)NHS(=O)O—, —C(=O)NH—, and —RC(=O)— (wherein, R is a C1 to C5 alkylene, a C6 to C20 arylene, or a combination thereof).

The perfluoropolyether compound may include a second linker between the second end and the perfluoropolyether moiety.

The second linker may include at least one moiety selected from a single bond, a C1 to C10 alkylene, —O—, —C(=O)—, —C(=O)O—, —OC(=O)O—, —NHC(=O)OR— (wherein, R is a C1 to C10 substituted or unsubstituted alkylene group), —C(=O)NH—, —OC(=O)NHS(=O)O—, and a polyester moiety including two or more repeating units represented by —RC(=O)O— (wherein, R is a C3 to C10 substituted or unsubstituted alkylene group).

The perfluoropolyether moiety may include a repeating unit represented by Chemical Formula 1, a repeating unit represented by Chemical Formula 2, optionally a repeating unit represented by Chemical Formula 3, or a combination thereof:

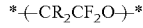  Chemical Formula 1 wherein, R is the same or different and each independently is F or CF$_3$ and * is a portion linked to an adjacent atom in a main chain;

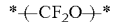  Chemical Formula 2 wherein, * is a portion linked to an adjacent atom in a main chain;

  Chemical Formula 3 wherein, R is the same or different and each independently is hydrogen, F, CH$_3$, or CF$_3$, and * is a portion linked to an adjacent atom in a main chain.

The perfluoropolyether compound may have a weight average molecular weight of greater than or equal to about 500 Daltons. The perfluoropolyether compound may have a weight average molecular weight of less than or equal to about 50,000 Daltons.

The perfluoropolyether compound may include a compound represented by Chemical Formula 4:

  Chemical Formula 4 wherein, R$^1$ includes a C5 to C60 substituted or unsubstituted aliphatic hydrocarbon group, a C6 to C60 substituted or unsubstituted aromatic hydrocarbon group, a C6 to C60 substituted or unsubstituted aliphatic hydrocarbon group wherein at least one methylene is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein, R is hydrogen or a C1 to C10 linear or branch alkyl group), imine (—NR—) (wherein, R is hydrogen or a C1 to C10 linear or branch alkyl group), or a combination thereof, a substituted or unsubstituted poly(alkylene oxide) residual group, a substituted or unsubstituted polyester residual group, or a combination thereof, $L^1$ includes a single bond, a C1 to C10 alkylene, —O—, —C(=O), —C(=O)O—, —OC(=O)O—, —NHC(=O)O—, —OC(=O)NHS(=O)O—, —RC(=O)— (wherein, R is a C1 to C5 alkylene, a C6 to C20 arylene, or a combination thereof), —C(=O)NH—, or a combination thereof, "PFPE" is a perfluoropolyether moiety, $L^2$ includes a single bond, a C1 to C10 alkylene, —O—, —C(=O)—, —C(=O)O—, —OC(=O)O—, —NHC(=O)OR— (wherein, R is a C1 to C10 substituted or unsubstituted alkylene group), —C(=O)NH—, —OC(=O)NHS(=O)O—, a polyester moiety including two or more repeating units represented by —RC(=O)O— (wherein, R is a C1 to C10 substituted or unsubstituted alkylene group), or a combination thereof, and X is the same or different and each independently includes a C1 to C3 alkyl group, a C1 to C3 alkoxy group, a hydroxy group, Cl, or a combination thereof.

The perfluoropolyether compound may include a compound represented by Chemical Formula 4-1, a compound represented by Chemical Formula 4-2, a compound represented by Chemical Formula 4-3, or a combination thereof.

R—COO—PFPE—OCONH—(CR'$_2$)$_n$—SiX$_3$  Chemical Formula 4-1 wherein, R is a C5 to C60 substituted or unsubstituted alkyl group, a C5 to C60 substituted or unsubstituted alkenyl group, or a C5 to C60 substituted or unsubstituted alkyl group or alkenyl group wherein at least one methylene is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein, R is hydrogen or a C1 to C10 linear or branch alkyl group), imine (—NR—) (wherein, R is hydrogen or a C1 to C10 linear or branch alkyl group), or a combination thereof, PFPE is a perfluoropolyether moiety, R' is the same or different and each independently is hydrogen or a C1 to n is 1 to 10, and X is the same or different and each independently includes a C1 to C3 alkyl group, a C1 to C3 alkoxy group, a hydroxy group, Cl, or a combination thereof.

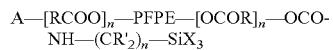
R—COO—Ar—COO—PFPE—OCONh—(CR'$_2$)$_n$—SiX$_3$  Chemical Formula 4-2 wherein, R is a C5 to C60 substituted or unsubstituted alkyl group, a C5 to C60 substituted or unsubstituted alkenyl group, or a C5 to C60 substituted or unsubstituted alkyl group or alkenyl group wherein at least one methylene is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein, R is hydrogen or a C1 to C10 linear or branch alkyl group), imine (—NR—) (wherein, R is hydrogen or a C1 to C10 linear or branch alkyl group), or a combination thereof, Ar is a substituted or unsubstituted phenylene or —(CR"$_2$)$_a$—Ph—(wherein, R" each independently is hydrogen or a C1 to C3 alkyl group, Ph is a substituted or unsubstituted phenylene group, and a is greater than or equal to 0, for example, greater than or equal to 1 and less than or equal to 10), PFPE is a perfluoropolyether moiety, R' is the same or different and each independently is hydrogen or a C1 to C3 alkyl group, X is the same or different and each independently includes a C1 to C3 alkyl group, a C1 to C3 alkoxy group, a hydroxy group, Cl, or a combination thereof, and n is 1 to 10.

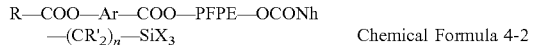
A—[RCOO]$_n$—PFPE—[OCOR]$_n$—OCO-NH—(CR'$_2$)$_n$—SiX$_3$  Chemical Formula 4-3

A is a hydroxy group, hydrogen, or a C1 to C3 alkyl group,

R is the same or different and each independently is a C2 to C10 alkylene group, R' is the same or different and each independently is hydrogen or a C1 to C3 alkyl group, and n of (CR'$_2$)$_n$ is 1 to 10.

X is the same or different and each independently includes a C1 to C3 alkyl group, a C1 to C3 alkoxy group, a hydroxy group, Cl, or a combination thereof.

The n of —RCOO—, and the n of —OCOR— may represent a ratio of an ester moiety —RCOO— or —OCOR— relative to PFPE and may correspond to a mole ratio that will be described later.

The organic solvent may include fluorinated alkyl ether, (e.g., dichloromethane, dichloroethane, etc.) chlorinated aliphatic hydrocarbon, chloroform, fluorinated aliphatic hydrocarbon, fluorinated alkyl ester, fluorinated alkyl ketone, or a combination thereof.

The organic solvent may include alkoxy fluoroalkane (e.g., ethoxy-nonafluorobutane) having 3 or more carbon atoms.

The composition may have a moisture content of less than about 100 parts per million.

In the composition, a content of the perfluoropolyether compound may be greater than or equal to about 0.001 percent by weight based on a total weight of the composition.

In the composition, a content of the perfluoropolyether compound may be less than or equal to about 90 percent by weight based on a total weight of the composition.

In another embodiment, a layered structure includes:

a substrate, and an organic layer disposed on the substrate, wherein the organic layer includes a perfluoropolyether compound, wherein the perfluoropolyether compound includes a first end and a second end facing each other and a perfluoropolyether moiety disposed between the first end and the second end, the first end includes an organic group having 5 or more (or 6 or more) carbon atoms, and the second end includes a —SiO— residual group.

The first end may not include fluorine.

The first end may not include silicon.

The substrate may include a hydroxy group on its surface.

The organic layer may be anchored on the substrate through a chemical bond (e.g., SiO bond) between a hydroxy moiety on the surface of the substrate and the second end.

A water contact angle on a surface of the organic layer may be greater than or equal to about 65°.

The water contact angle on a surface of the organic layer may be greater than or equal to about 90°.

The water contact angle on a surface of the organic layer may be greater than or equal to about 115°.

A coefficient of friction (hereinafter, referred to as COF) on the surface of the organic layer may be less than or equal to about 0.40, for example, less than or equal to about 0.39, or less than or equal to about 0.38.

A surface of the organic layer may exhibit fingerprint invisibility.

Another embodiment provides an electronic device including the layered structure.

The electronic device may be a display, a touch screen panel, or an e-window.

In another embodiment, the perfluoropolyether compound is represented by Chemical Formula 4:

   Chemical Formula 4 wherein, $R^1$ is a C5 to C60 substituted or unsubstituted aliphatic hydrocarbon group, a C6 to C60 substituted or unsubstituted aliphatic hydrocarbon group wherein at least one methylene is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein, R is hydrogen or a C1 to C10 linear or branch alkyl group), imine (—NR—) (wherein, R is hydrogen or a C1 to C10 linear or branch alkyl group), or a combination thereof, a substituted or unsubstituted poly(alkylene oxide) residual group, a substituted or unsubstituted polyester residual group, or a combination thereof, $L^1$ includes a single bond, a C1 to C10 alkylene, —O—, —O(=O)O—, —OC(=O)O—, —NHC(=O)O—, —NHC(=O)—, —OC(=O)NHS(=O)O—, —RC(=O)— (wherein, R is a C1 to C5 alkylene, a C6 to C20 arylene, or a combination thereof), or a combination thereof, PFPE is a perfluoropolyether moiety, $L^2$ includes a single bond, a C1 to C10 alkylene, —O—, —C(=O)O—, —OC(=O)O—, —R—NHC(=O)O— (wherein, R is NHC(=O), —OC(=O)NHS(=O)O—, a polyester moiety including two or more repeating units represented by —RC(=O)O— (wherein, R is a C2 to C10 substituted or unsubstituted alkylene group), —RC(=O)— (wherein, R is a C1 to C5 alkylene, a C6 to C20 arylene, or a combination thereof), or a combination thereof, and X is the same or different and each independently includes a C1 to C3 alkyl group, a C1 to C3 alkoxy group, a hydroxy group, Cl, or a combination thereof.

The perfluoropolyether compound may include a perfluoropolyether compound represented by Chemical Formula 4-1, 4-2, or 4-3:

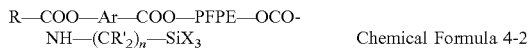   Chemical Formula 4-1 wherein, R is a C5 to C60 substituted or unsubstituted alkyl group, a C5 to C60 substituted or unsubstituted alkenyl group, or a C5 to C60 substituted or unsubstituted alkyl group or alkenyl group wherein at least one methylene is replaced by sulfonyl (—S(=O)$_2$—), carbonyl (—C(=O)—), ether (—O—), sulfide (—S—) sulfoxide (—S(=O)—), ester (—C(=O)O—), amide (—C(=O)NR—) (wherein, R is hydrogen or a C1 to C10 linear or branch alkyl group), imine (—NR—) (wherein, R is hydrogen or a C1 to C10 linear or branch alkyl group), or a combination thereof, PFPE is a perfluoropolyether moiety, R' is the same or different and each independently is hydrogen or a C1 to C3 alkyl group, n is 1 to 10, and X is the same or different and each independently includes a C1 to C3 alkyl group, a C1 to C3 alkoxy group, a hydroxy group, Cl, or a combination thereof,

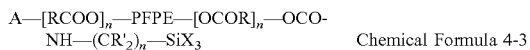   Chemical Formula 4-2 wherein, R is a C5 to C60 substituted or unsubstituted alkyl group, a C5 to C60 substituted or unsubstituted alkenyl group, or a C5 to C60 substituted or unsubstituted alkyl group or alkenyl group wherein at least one methylene is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein, R is hydrogen or a C1 to C10 linear or branch alkyl group), imine (—NR—) (wherein, R is hydrogen or a C1 to C10 linear or branch alkyl group), or a combination thereof, Ar is a substituted or unsubstituted phenylene or —(CR''$_2$)$_a$—Ph—(wherein, R'' are independently hydrogen or a C1 to C3 alkyl group, Ph is a substituted or unsubstituted phenylene group, and a is 0 to 10), PFPE is a perfluoropolyether moiety, R' is the same or different and each independently is hydrogen or a C1 to C3 alkyl group, X is the same or different and each independently includes a C1 to C3 alkyl group, a C1 to C3 alkoxy group, a hydroxy group, Cl, or a combination thereof, and n is 1 to 10.

A—[RCOO]$_n$—PFPE—[OCOR]$_n$—OCO-NH—(CR'$_2$)$_n$—SiX$_3$   Chemical Formula 4-3

A is a hydroxy group, hydrogen, or a C1 to C3 alkyl group,

R is the same or different and each independently is a C2 to C10 alkylene group, R' is the same or different and each independently is hydrogen or a C1 to C3 alkyl group, n of (CR'$_2$)$_n$ is 1 to 10.

X is the same or different and each independently includes a C1 to C3 alkyl group, a C1 to C3 alkoxy group, a hydroxy group, Cl, or a combination thereof.

The n of —RCOO— and the n of —OCOR— may represent a ratio of an ester moiety —RCOO— or —OCOR— relative to PFPE and may correspond to a mole ratio that will be described later.

In Chemical Formula 4, the perfluoropolyether moiety may include a repeating unit represented by Chemical Formula 1, a repeating unit represented by Chemical Formula 2, optionally a repeating unit represented by Chemical Formula 3, or a combination thereof:

   Chemical Formula 1 wherein, R is the same or different and each independently is F or CF$_3$ and * is a portion linked to an adjacent atom in a main chain;

   Chemical Formula 2 wherein, * is a portion linked to an adjacent atom in a main chain;

   Chemical Formula 3 wherein, R is the same or different and each independently is hydrogen, F, CH$_3$, or CF$_3$ and * is a portion linked to an adjacent atom in a main chain.

The perfluoropolyether compound may be a linear polymer.

The perfluoropolyether compound may have a weight average molecular weight of greater than or equal to about 500 Daltons and less than or equal to about 50,000 Daltons.

The composition according to an embodiment may provide a layer (or a film) showing anti-fingerprint property and fingerprint invisibility, and thus, be applied to various products (e.g., an electronic device such as a touch screen panel or a display device). The film formed of the composition may show a soft sense of touch, and when a fingerprint and the like is left thereon, the fingerprint and the like may be invisible as well as easily removed.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
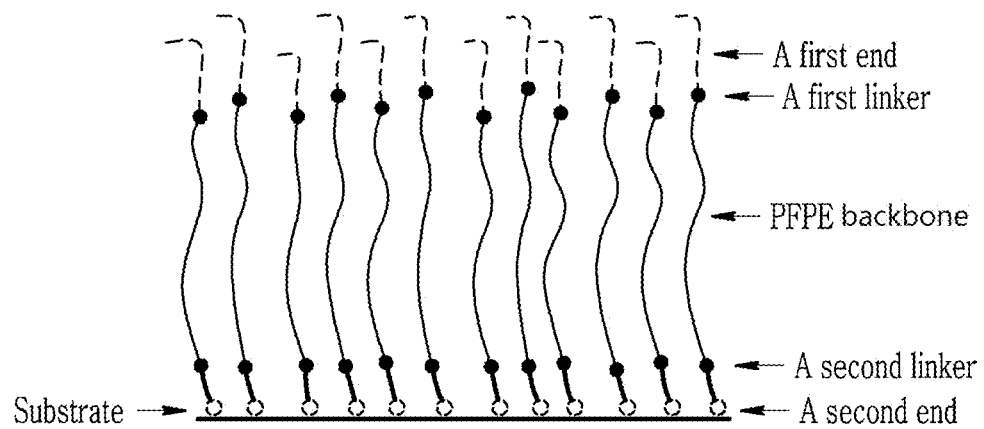
FIG. 1 schematically shows a theoretical configuration of a perfluoropolyether (PFPE) compound in an organic layer formed from a composition according to a non-limiting embodiment.

Advantages and characteristics of this disclosure, and a method for achieving the same, will become evident referring to the following exemplary embodiments together with the drawings attached hereto. However, the embodiments should not be construed as being limited to the embodiments set forth herein. Unless otherwise defined, all terms used in the specification (including technical and scientific terms) may be used with meanings commonly understood by a person having ordinary knowledge in the art. The terms defined in a generally-used dictionary may not be interpreted ideally or with exaggeration unless clearly defined. In addition, unless explicitly described to the contrary, the word "comprise" and variations such as "comprises" or "comprising", will be understood to imply the inclusion of stated elements but not the exclusion of any other elements.

Further, the singular includes the plural unless mentioned otherwise.

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, when a definition is not otherwise provided, "substituted" refers to replacement of at least one of hydrogen atoms of a compound or a moiety by a substituent selected from a C1 to C30 alkyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (—F, —Cl, —Br, or —I), a hydroxy group (—OH), a nitro group (—NO$_2$), a cyano group (—CN), an amino group (—NRR' wherein R and R' are independently hydrogen or a C1 to C6 alkyl group), an azido group (—N$_3$), an amidino group (—C(=NH)NH$_2$)), a hydrazino group (—NHNH$_2$), a hydrazono group (=N NH$_2$), an aldehyde group (—C(=O)H), a carbamoyl group (—C(O)NH$_2$), a thiol group (—SH), an ester group (—C(=O)OR, wherein R is a C1 to C6 alkyl group or a C6 to C12 aryl group), a carboxyl group (—COOH) or a salt thereof (—C(=O)OM, wherein M is an organic or inorganic cation), a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), and a combination thereof.

Herein, a hydrocarbon group refers to a group including carbon and hydrogen (e.g., an alkyl, alkenyl, alkynyl, or aryl group). The hydrocarbon group may be a group having valence one or greater formed by removal of one or more hydrogen atoms from, alkane, alkene, alkyne, or arene. In the hydrocarbon group, at least one methylene may be replaced by an oxide moiety, a carbonyl moiety, an ester moiety, —NH—, or a combination thereof.

Herein, the term "alkyl" refers to a linear or branched saturated monovalent hydrocarbon group (methyl, ethyl hexyl, etc.).

Herein, the term "alkenyl" refers to a linear or branched monovalent hydrocarbon group having one or more carbon-carbon double bond.

Herein, the term "aryl" refers to a group formed by removal of at least one hydrogen from an aromatic group (e.g., a phenyl or a naphthyl group).

A composition according to an embodiment includes a perfluoropolyether compound, and an organic solvent configured to dissolve or disperse the perfluoropolyether compound. The perfluoropolyether compound includes a first end and a second end facing each other and a perfluoropolyether moiety (e.g., backbone) disposed between the first end and the second end. The first end includes an organic group having 5 or more (or 6 or more) carbon atoms (i.e., a carbon number of 5 or more or 6 or more). The first end may not include fluorine. The first end may not include silicon. The second end includes a hydrolysable silicon-containing residual group.

The perfluoropolyether compound allows the organic layer or the organic film prepared from the composition to show a soft touch and to prevent/suppress a contamination thereof due to a contaminant such as a fingerprint, and also may make it possible for the attached contamination to be removed relatively easily. And at the same time, the perfluoropolyether compound may allow the organic layer/film to have invisibility.

In the perfluoropolyether compound, the organic group of the first end may include a substituted or unsubstituted aliphatic hydrocarbon group (e.g., an alkyl group, an alkenyl group, or an alkynyl group) having 5 or more carbon atoms (e.g., a carbon number of 6 or more, a carbon number of 8 or more, a carbon number of 10 or more, a carbon number of 12 or more, a carbon number of 15 or more, a carbon number of 18 or more, or a carbon number of 20 or more) and a carbon number of 60 or less (e.g., a carbon number of 50 or less, a carbon number of 40 or less, or a carbon number of 30 or less), a substituted or unsubstituted aromatic hydrocarbon group (e.g., an aryl group or an arylalkyl group) having 6 or more carbon atoms (e.g., a carbon number of 8 or more, a carbon number of 10 or more, or a carbon number of 12 or more) and a carbon number of 60 or less (e.g., a carbon number of 50 or less, a carbon number of 40 or less, or a carbon number of 30 or less), a substituted or unsubstituted poly(alkylene oxide) residual group, a substituted or unsubstituted polyester residual group, or a combination thereof. In the substituted or unsubstituted aliphatic hydrocarbon group, at least one methylene may be replaced by sulfonyl (—S(═O)$_2$—), carbonyl (—C(═O)—), ether (—O—), sulfide (—S—), sulfoxide (—S(═O)—), ester (—C(═O)O—), amide (—C(═O)NR—) (wherein, R is hydrogen or a C1 to C10 linear or branch alkyl group), imine(—NR—) (wherein, R is hydrogen or a C1 to C10 linear or branch alkyl group) or a combination thereof.

In an embodiment, the organic group of the first end may include a C5 to C60 substituted or unsubstituted alkyl group, a C5 to C60 substituted or unsubstituted alkenyl group, a C6 to C60 substituted or unsubstituted aryl group, a C7 to C60 substituted or unsubstituted arylalkyl group, a polyester moiety including a repeating unit represented by —RC(═O)O— (wherein, R is a C2 to C10 substituted or unsubstituted alkylene group) (e.g., polypropinolactone, polybutyrolactone, polyvalerolactone, or polycaprolactone residual group), or a combination thereof.

Without wishing to be bound by any theory, it is understood that by the inclusion of the first end, the perfluoropolyether compound may provide invisibility without having any substantial adverse effect on a touch feeling and an anti-fingerprint property for the prepared organic layer or film.

The perfluoropolyether compound may include a first linker between the first end and the perfluoropolyether moiety (e.g., perfluoropolyether backbone). The first linker may include at least one moiety selected from a single bond, a C1 to C10 alkylene, —O—, —C(═O), —(═O)O—, —OC(═O)O—, —NHC(═O)O—, —OC(═O)NHS(═O) O—, —C(═O)NH—, and —RC(═O)— (wherein, R is a C1 to C5 alkylene such as methylene, ethylene, propylene, isopropylene, butylene, isobutylene, pentylene, etc., a C6 to C20 arylene such as phenylene, and a combination thereof, for example, alkarylene). As used herein, the term "alkarylene" refers to a divalent group including both of the aliphatic hydrocarbon group and the aromatic hydrocarbon group.

The second end may include —SiX$_3$ (wherein, X is the same or different and each independently includes a C1 to C3 alkyl group such as methyl, ethyl, or propyl, a C1 to C3 alkoxy group such as methoxy, ethoxy, or propoxy, hydroxy, Cl, or a combination thereof).

The perfluoropolyether compound may include a second linker between the second end and the perfluoropolyether moiety. The second linker may include at least one moiety selected from a single bond, a C1 to C10 alkylene group, —O—, —C(═O)—, —C(═O)O—, —OC(═O)O—, —NHC(═O)OR— (wherein, R is a C1 to C10 substituted or unsubstituted alkylene group), —C(═O)NH—, —OC (═O)NHS(═O)O—, and a polyester moiety including two or more repeating units represented by —RC(═O)O— (wherein, R is a C3 to C10 substituted or unsubstituted alkylene group).

In the first end and the second linker, the polyester moiety may include polypropinolactone, polybutyrolactone, polyvalerolactone, polycaprolactone, or a combination thereof. If present in the first end or the second linker, a content of the —RC(═O)O— repeating unit of the polyester moiety may be greater than or equal to about 1 mole (mol), greater than or equal to about 2 moles (mol), greater than or equal to about 3 mol, greater than or equal to about 4 mol, greater than or equal to about 5 mol, greater than or equal to about 6 mol, greater than or equal to about 7 mol, greater than or equal to about 8 mol, greater than or equal to about 9 mol, greater than or equal to about 10 mol, greater than or equal to about 15 mol, greater than or equal to about 20 mol, greater than or equal to about 25 mol, greater than or equal to about 30 mol, greater than or equal to about 40 mol, greater than or equal to about 50 mol, greater than or equal to about 60 mol, greater than or equal to about 70 mol, greater than or equal to about 80 mol, greater than or equal to about 90 mol, greater than or equal to about 100 mol, greater than or equal to about 150 mol, greater than or equal to about 200 mol, greater than or equal to about 250 mol, greater than or equal to about 300 mol, greater than or equal to about 350 mol, greater than or equal to about 400 mol, greater than or equal to about 450 mol, greater than or equal to about 500 mol, greater than or equal to about 550 mol, greater than or equal to about 600 mol, greater than or equal to about 650 mol, or greater than or equal to about 700 mol per 1 mol of PFPE. If present in the first end or the second linker, a content of the —RC(═O)O— repeating unit of the polyester moiety may be less than or equal to about 1,000 mol, less than or equal to about 900 mol, less than or equal to about 800 mol, less than or equal to about 700 mol, less than or equal to about 600 mol, less than or equal to about 500 mol, less than or equal to about 400 mol, less than or equal to about 300 mol, less than or equal to about 200 mol, or less than or equal to about or 100 mol per 1 mol of PFPE.

The perfluoropolyether moiety may include a repeating unit represented by Chemical Formula 1, a repeating unit represented by Chemical Formula 2, optionally a repeating unit represented by Chemical Formula 3, or a combination thereof:

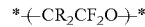   Chemical Formula 1 wherein, R is the same or different and each independently is F or CF$_3$ and * is a portion linked to an adjacent atom in a main chain;

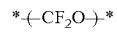   Chemical Formula 2 wherein, * is a portion linked to an adjacent atom in a main chain;

   Chemical Formula 3 wherein, R is the same or different and each independently is hydrogen, F, CH$_3$, or CF$_3$ and * is a portion linked to an adjacent atom in a main chain. In Chemical Formula 3, at least one R may be F or CF$_3$.

The perfluoropolyether moiety includes a moiety represented by Chemical Formula 1 and a moiety represented by Chemical Formula 2, and a mole ratio of the moiety represented by Chemical Formula 1 and the moiety represented by Chemical Formula 2 may be about 1:0.1 to about 1:10.

The perfluoropolyether moiety may include a repeating unit represented by Chemical Formula 1 and a repeating unit represented by Chemical Formula 2. In an embodiment, the perfluoropolyether moiety may include a repeating unit represented by Chemical Formula A:

  Chemical Formula A

Herein, R is the same or different and each independently is F or CF$_3$, * is a portion linked to an adjacent atom in a main chain of the polymer, p is an integer of 1 to 100, and q is an integer of 1 to 100.

The perfluoropolyether compound may have a weight average molecular weight of greater than or equal to about 500 Daltons (Da), for example, greater than or equal to about 1,000 Da, greater than or equal to about 1,500 Da, greater than or equal to about 2,000 Da, greater than or equal to about 2,500 Da, greater than or equal to about 2,600 Da, greater than or equal to about 2,700 Da, greater than or equal to about 2,800 Da, greater than or equal to about 2,900 Da, greater than or equal to about 3,000 Da, greater than or equal to about 3,100 Da, greater than or equal to about 3,200 Da, greater than or equal to about 3,300 Da, greater than or equal to about 3,400 Da, greater than or equal to about 3,500 Da, greater than or equal to about 3,600 Da, greater than or equal to about 3,700 Da, greater than or equal to about 3,800 Da, greater than or equal to about 3,900 Da, greater than or equal to about 4,000 Da, greater than or equal to about 4,100 Da, greater than or equal to about 4,200 Da, greater than or equal to about 4,300 Da, greater than or equal to about 4,400 Da, greater than or equal to about 4,500 Da, greater than or equal to about 4,600 Da, greater than or equal to about 4,700 Da, greater than or equal to about 4,800 Da, greater than or equal to about 4,900 Da, greater than or equal to about 5,000 Da, greater than or equal to about 5,100 Da, greater than or equal to about 5,200 Da, greater than or equal to about 5,300 Da, greater than or equal to about 5,400 Da, greater than or equal to about 5,500 Da, greater than or equal to about 5,600 Da, greater than or equal to about 5,700 Da, greater than or equal to about 5,800 Da, greater than or equal to about 5,900 Da, or greater than or equal to about or 6,000 Da. As used herein, the weight average molecular weight may be determined in any method (for example, a gel permeation chromatography (GPC)) at any condition (e.g., at room temperature such as 25-30° C. and ambient pressure such as atmospheric pressure)

The perfluoropolyether compound may have a weight average molecular weight of less than or equal to about 50,000 Da, for example, 45,000 Da, less than or equal to about 40,000 Da, less than or equal to about 35,000 Da, less than or equal to about 30,000 Da, less than or equal to about 25,000 Da, less than or equal to about 20,000 Da, less than or equal to about 15,000 Da, less than or equal to about 14,000 Da, less than or equal to about 13,000 Da, less than or equal to about 12,000 Da, less than or equal to about 11,000 Da, less than or equal to about 10,000 Da, less than or equal to about 9,000 Da, less than or equal to about 8,000 Da, or less than or equal to about or 7,000 Da.

The perfluoropolyether compound may be a linear polymer. The perfluoropolyether compound may not include a polyurethane residual group. For example, the first end and the first linker may not include a polyurethane repeating unit.

In an embodiment, the perfluoropolyether compound may include a compound represented by Chemical Formula 4:

  Chemical Formula 4 wherein, R$^1$ includes a C5 to C60 substituted or unsubstituted aliphatic hydrocarbon group, a C6 to C60 substituted or unsubstituted aromatic hydrocarbon group, a C5 to C60 substituted or unsubstituted aliphatic hydrocarbon group wherein at least one methylene is replaced by sulfonyl (—S(═O)$_2$—), carbonyl (—C(═O)—), ether (—O—), sulfide (—S—), sulfoxide (—S(═O)—), ester (—C(═O)O—), amide (—C(═O)NR—) (wherein, R is hydrogen or a C1 to C10 linear or branch alkyl group), imine (—NR—) (wherein, R is hydrogen or a C1 to C10 linear or branch alkyl group), or a combination thereof, a substituted or unsubstituted poly(alkylene oxide) residual group, a substituted or unsubstituted polyester residual group, or a combination thereof, L$^1$ includes a single bond, a C1 to C10 alkylene, —O—, —C(═O)—, —C(═O)O—, —OC(═O)O—, —NHC(═O)O—, —OC(═O)NHS(═O)O—, —RC(═O)— (wherein, R is a C1 to C5 alkylene, a C6 to C20 arylene, or a combination thereof), —C(═O)NH—, or a combination thereof, PFPE is a perfluoropolyether moiety, L$^2$ includes a single bond, a C1 to C10 alkylene, —O—, —C(═O)—, —C(═O)O—, —OC(═O)O—, —NHC(═O)OR— (wherein, R is a C1 to C10 substituted or unsubstituted alkylene group), —C(═O)NH—, —OC(═O)NHS(═O)O—, a polyester moiety including two or more repeating units represented by —RC(═O)O— (wherein, R is a C1 to C10 substituted or unsubstituted alkylene group), or a combination thereof, and X is the same or different and each independently includes a C1 to C3 alkyl group (methyl, ethyl, or propyl), a C1 to C3 alkoxy group (e.g., methoxy, ethoxy, or propoxy), a hydroxy group, Cl, or a combination thereof.

Details of R$^1$ are the same as described for the first residual group. Details of L$^1$ are the same as described for the first linker. Details of PFPE are the same as described for the perfluoropolyether moiety. Details of L$^2$ are the same as described for the second linker.

The perfluoropolyether compound may include a compound represented by Chemical Formula 4-1, a compound represented by Chemical Formula 4-2, a compound represented by Chemical Formula 4-3, or a combination thereof.

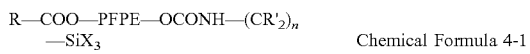  Chemical Formula 4-1 wherein, R is a C5 to C60 substituted or unsubstituted alkyl group, a C5 to C60 substituted or unsubstituted alkenyl group, or a C6 to C60 substituted or unsubstituted alkyl group or alkenyl group wherein at least one methylene is replaced by sulfonyl (—S(═O)$_2$—), carbonyl (—C(═O)—), ether (—O—), sulfide (—S—), sulfoxide (—S(═O)—), ester (—C(═O)O—), amide (—C(═O)NR—) (wherein, R is hydrogen or a C1 to C10 linear or branch alkyl group), imine (—NR—) (wherein, R is hydrogen or a C1 to C10 linear or branch alkyl group), or a combination thereof, PFPE is a perfluoropolyether moiety, R' is the same or different and each independently is hydrogen or a C1 to C3 alkyl group, n is 1 to 10, and X is the same as defined in Chemical Formula 4.

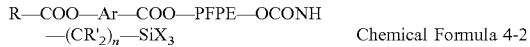  Chemical Formula 4-2 wherein, R is a C5 to C60 substituted or unsubstituted alkyl group, a C5 to C60 substituted or unsubstituted alkenyl group, or a C6 to C60 substituted or unsubstituted alkyl group or alkenyl group wherein at least one methylene is replaced by sulfonyl (—S(═O)$_2$—), carbonyl (—C(═O)—), ether (—O—), sulfide (—S—), sulfoxide (—S(═O)—), ester (—C(═O)O—), amide (—C(═O)NR—) (wherein, R is hydrogen or a C1 to C10 linear or branch alkyl group), imine (—NR—) (wherein, R is hydrogen or a C1 to C10 linear or branch alkyl group), or a combination thereof, and Ar is a substituted or unsubstituted phenylene or —(CR"$_2$)$_a$—Ph—(wherein, R" is each independently hydrogen or a C1 to C3 alkyl group, Ph is a substituted or unsubstituted phenylene group, and a is greater than or equal to 0, for example, greater than or equal to 1 and less than or equal to 10).

PFPE is the same as defined in Chemical Formula 4.

R' is the same or different and each independently is hydrogen or a C1 to C3 alkyl group, n is 1 to 10, and X is the same as defined in Chemical Formula 4.

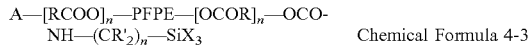

A—[RCOO]$_n$—PFPE—[OCOR]$_n$—OCO-
    NH—(CR'$_2$)$_n$—SiX$_3$      Chemical Formula 4-3 wherein, A is a hydroxy group, hydrogen, or a C1 to C3 alkyl group,

R is a C3 to C10 alkylene group,

R' is the same or different and each independently is hydrogen or a C1 to C3 alkyl group, n of (CR')$_n$ is 1 to 10.

PFPE is the same as defined in Chemical Formula 4, and

X is the same as defined in Chemical Formula 4.

In —COOR—$_n$, n of —OCOR— may represent a ratio of an ester moiety —RCOO— or —OCOR— relative to PFPE and may correspond to a mole ratio that will be described later.

The perfluoropolyether compound may be prepared by an appropriate method. In an embodiment, a method of preparing the perfluoropolyether compound may include:

obtaining a perfluoropolyether (e.g., a perfluoropolyether diol compound) including a reactive moiety (e.g., a hydroxy group) at both ends, introducing a first end and optionally, a first linker into the perfluoropolyether, and introducing a second end, and optionally, a second linker into the perfluoropolyether. The processes of introducing the first end (and optionally, the first linker) and introducing the second end (and optionally, the second linker) may be performed in any order or simultaneously.

The perfluoropolyether having a reactive moiety at both ends (hereinafter, also referred to as terminal reactive perfluoropolyether, for example, perfluoropolyether diol, perfluoropolyether carboxylic acid) may be commercially available from DuPont, Solvay Specialty Polymers L.L.C. and the like or may be prepared by a known method. In non-limiting examples, the perfluoropolyether having a reactive moiety at both ends may be represented by the following chemical formula:

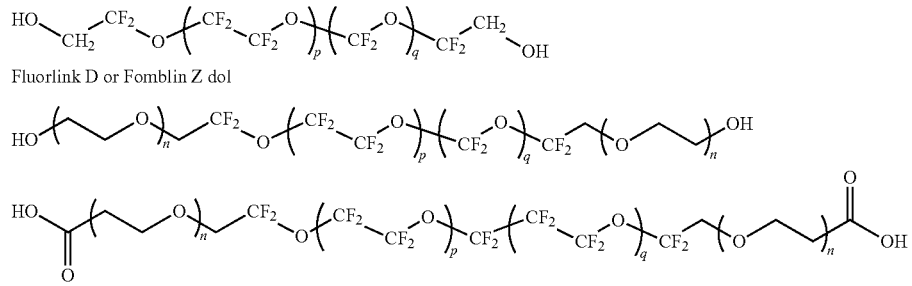

A molecular weight of the terminal reactive perfluoropolyether may be appropriately selected by considering a desirable molecular weight of a final PFPE compound. Herein, in the above Chemical Formula, perfluoropolyether having p and q in various ratios is commercially available, and thus, if necessary, perfluoropolyether having an appropriate ratio may be selected. A weight average molecular weight of the terminal reactive perfluoropolyether may be greater than or equal to about 1,000 Da, for example, greater than or equal to about 1,100 Da, greater than or equal to about 1,200 Da, greater than or equal to about 1,300 Da, greater than or equal to about 1,400 Da, greater than or equal to about 1,500 Da, greater than or equal to about 1,600 Da, greater than or equal to about 1,700 Da, greater than or equal to about 1,800 Da, greater than or equal to about 1,900 Da, greater than or equal to about 2,000 Da, greater than or equal to about 2,500 Da, greater than or equal to about 3,000 Da, greater than or equal to about 3,500 Da, greater than or equal to about 4,000 Da, greater than or equal to about 4,500 Da, greater than or equal to about 5,000 Da, greater than or equal to about 5,500 Da, greater than or equal to about 6,000 Da, greater than or equal to about 6,500 Da, greater than or equal to about 7,000 Da, or greater than or equal to about 7,500 Da and less than or equal to about 30,000 Da, less than or equal to about 20,000 Da, less than or equal to about 15,000 Da, or less than or equal to about 10,000 Da. A molecular weight of the terminal reactive perfluoropolyether may be appropriately selected by considering properties of a final perfluoropolyether compound (e.g., anti-fingerprint property and the like).

A compound for introducing the first end, the first linker, the second end, and/or the second linker may be appropriately selected by considering a structure of the final PFPE compound. The compound for introducing the first end, the first linker, the second end, and the second linker may include a moiety (e.g., carbonyl chloride, isocyanate, carboxylic acid, etc.) reacting with a reactive group of PFPE. A reaction condition for introducing the first end, the first linker, the second end, and the second linker may be appropriately selected by considering a kind of compounds and the like, but is not particularly limited thereto.

In the composition, the organic solvent may include a liquid compound capable of dispersing or dissolving the perfluorinated polyether compound. The organic solvent may include a halogenated solvent. The organic solvent may include chlorinated carbon or chlorinated alkane such as chloroform, dichloromethane, or dichloroethane, fluorinated alkyl ether such as tetrafluoro(trifluoroethoxy)ethane, fluorinated carbon, fluorinated hydrocarbon (e.g., octafluorobutane, decafluoropentane, nonafluorohexane and the like fluorinated alkane, fluorinated alkene), fluorinated alkyl ester, fluorinated alkyl ketone, or a combination thereof. The organic solvent may include alkoxy fluoroalkane having 3 or more carbon atoms (e.g., ethoxy nanofluorobutane).

The composition may have a moisture content of less than about 100 parts per million (ppm). The composition may not include moisture substantially.

In the composition, a content of the perfluoropolyether compound may be determined considering a process of forming an organic layer, coating properties of the composition, a thickness of a formed layer, and the like.

In an embodiment, in the composition, the content of the perfluoropolyether compound may be greater than or equal to about 0.001 percent by weight (wt %), for example, greater than or equal to about 0.01 wt %, greater than or equal to about 0.05 wt %, greater than or equal to about 0.1 wt %, greater than or equal to about 0.2 wt %, greater than or equal to about 0.3 wt %, greater than or equal to about 0.4 wt %, greater than or equal to about 0.5 wt %, greater than or equal to about 0.6 wt %, greater than or equal to about 0.7 wt %, greater than or equal to about 0.8 wt %, greater than or equal to about 0.9 wt %, greater than or equal to about 1 wt %, greater than or equal to about 2 wt %, greater than or equal to about 3 wt %, greater than or equal to about 4 wt %, greater than or equal to about 5 wt %, greater than or equal to about 6 wt %, greater than or equal to about 7 wt %, greater than or equal to about 8 wt %, greater than or equal to about 9 wt %, greater than or equal to about 10 wt %, greater than or equal to about 11 wt %, greater than or equal to about 12 wt %, greater than or equal to about 13 wt %, greater than or equal to about 14 wt %, greater than or equal to about 15 wt %, greater than or equal to about 16 wt %, greater than or equal to about 17 wt %, greater than or equal to about 18 wt %, greater than or equal to about 19 wt %, greater than or equal to about 20 wt %, greater than or equal to about 30 wt %, greater than or equal to about 40 wt %, greater than or equal to about 50 wt %, greater than or equal to about 60 wt %, greater than or equal to about 70 wt %, greater than or equal to about 80 wt %, or greater than or equal to about 90 wt % based on a total weight of the composition.

In the composition, the content of the perfluoropolyether compound may be less than or equal to about 99.999 wt %, less than or equal to about 90 wt %, less than or equal to about 89 wt %, less than or equal to about 88 wt %, less than or equal to about 87 wt %, less than or equal to about 86 wt %, less than or equal to about 85 wt %, less than or equal to about 84 wt %, less than or equal to about 83 wt %, less than or equal to about 82 wt %, less than or equal to about 81 wt %, less than or equal to about 80 wt %, less than or equal to about 70 wt %, less than or equal to about 60 wt %, less than or equal to about 50 wt %, less than or equal to about 40 wt %, less than or equal to about 30 wt %, less than or equal to about 20 wt %, less than or equal to about 10 wt %, less than or equal to about 5 wt %, less than or equal to about 1 wt %, or less than or equal to about 0.001 wt % based on a total weight of the composition.

In the composition, the amount of the components, except for the PFPE compound, may be a content of the solvent. In another embodiment, the composition may further include various additives such as a hardener, a leveling agent, an organic/inorganic particulate, a photoinitiator, or various types of monomer. The additives are respectively included within a suitable amount range so as not to hinder performance of the perfluoropolyether compound (e.g., fingerprint resistant performance, a soft sense of touch, fingerprint invisibility, and the like).

In another embodiment, a layered structure includes:
a substrate; and
an organic layer disposed on the substrate, wherein the organic layer includes a perfluoropolyether compound,
wherein the perfluoropolyether compound includes a first end and a second end facing each other and a perfluoropolyether moiety disposed between the first end and the second end, wherein the first end includes an organic group having 5 or more (or 6 or more) carbon atoms, and wherein the second end includes a —SiO— residual group (e.g., that is derived from the hydrolysable silicon-containing residual group).

The first end may not include fluorine. The first end may not include silicon.

The substrate may be a transparent substrate. The substrate may be an electrically insulative substrate. Materials of the substrate are not particularly limited, and the substrate may be a glass substrate, a tempered glass substrate, a semiconductor substrate, a polymer substrate, or a combination thereof. In non-limiting examples, the substrate may include an inorganic material such as glass; a polymer, for example, polyesters such as polyethyleneterephthalate, polybutyleneterephthalate, or polyethylenenaphthalate, polycarbonates, acrylic polymer, celluloses, or a derivative thereof, polyimide; an organic/inorganic hybrid material; or combinations thereof. A thickness of the substrate is not particularly limited and may be selected according to a type of a final product. For example, the thickness of the substrate may be greater than or equal to about 100 micrometers (um), for example greater than or equal to about 200 um, but is not limited thereto. The thickness of the substrate may be less than or equal to about 20 millimeters (mm), for example less, than or equal to about 1 mm, but is not limited thereto.

The substrate may include a hydroxy group on its surface. The organic layer may be anchored on the substrate through a chemical bond (e.g., SiO bond) between a hydroxy moiety on the surface of the substrate and the second end.

Formation of the organic layer including the aforementioned perfluoropolyether compound on the substrate may include using (e.g., coating) of the composition. Details of the perfluoropolyether compound are the same as set forth above for the composition. The formation of the organic layer may be performed in various coating methods (e.g., wet coating or deposition). The wet coating may include coating the composition having an appropriate concentration on the substrate and then, removing a solvent therefrom. The composition may be coated by various coating methods, for example, bar coating, blade coating, slot die coating, spray coating, spin coating, gravure coating, ink jet printing, dip coating, or a combination thereof.

The deposition may be, for example, performed by disposing the composition having an appropriate concentration (viscosity) and the substrate under vacuum at an appropriate temperature (e.g., room temperature to about 100° C. or higher).

A thickness of the organic layer is not particularly limited and may be selected appropriately. For example, the thickness of the organic layer may be about 5 nanometers (nm) to about 100 nm, but is not limited thereto.

FIG. 1 is a schematic view of a layered structure including a substrate and an organic layer according to a non-limiting example. Without wishing to be bound by any theory, referring to FIG. 1, it is understood that the organic layer may be (for example, firmly) anchored on the substrate through a second end, and the inclusion of the PFPE moiety may contribute to an appropriate fingerprint-resistance performance of the organic layer. At the same time, a first end of the PFPE compound may relieve (or suppress) formation of a lump of contaminants (e.g., a fingerprint and the like).

Accordingly, the layered structure may have invisibility even when the contaminants such as fingerprint is attached thereto.

Accordingly, in the layered structure, a water contact angle on a surface of the organic layer may be greater than or equal to about 65°, for example, greater than or equal to about 70°, greater than or equal to about 80°, greater than or equal to about 90°, greater than or equal to about 100°, greater than or equal to about 105°, greater than or equal to about 110°, greater than or equal to about 115°, or greater than or equal to about 120°. The water contact angle on the surface of the organic layer may be less than or equal to about 180°, or less than or equal to about for example 95°. Herein, a water contact angle may be measured according to a manual standard measurement method of DSA 100 (KRUSS GmbH, Hamburg, Germany).

A coefficient of friction (hereinafter, also referred to as COF) on the surface of the organic layer may be less than or equal to about 0.40, for example, less than or equal to about 0.39, or less than or equal to about 0.38. Accordingly, the surface of the organic layer may have a soft touch feeling. Herein, a coefficient of friction may be measured according to a manual standard measurement method of FPT-F1 (LAB-THINK Instruments Co., Ltd., Jinan, China).

The surface of the organic layer may show fingerprint invisibility and a property of easy removal thereof. In the present specification, the "fingerprint invisibility" is determined by stamping an artificial sweat liquid on the surface of the organic layer, sliding the same under a predetermined pressure (e.g., 0.3 kilogram-force, kgf) and examining whether the sweat liquid is left or not on a resulting product with a naked eye or an optical microscope. Herein, the easy removal property is determined by wiping (sliding) the sweat liquid thereon under a predetermined pressure (e.g., 1.5 kgf) with a cloth (e.g., a cotton fabric) capable of absorbing the same and examining whether the sweat liquid is left or not on a resulting product with a naked eye or an optical microscope. The first end (not including fluorine) of the PFPE compound included in a surface of the organic layer may contribute to fingerprint invisibility of the organic layer. In an embodiment, presence of the first end (not including fluorine) may be confirmed by fingerprint invisibility of the organic layer including the PFPE compound.

Another embodiment provides an electronic device including the layered structure. The electronic device may be a display, a touch screen panel, or an e-window.

Hereinafter, non-limiting examples are illustrated. However, these examples are exemplary, and the present disclosure is not limited thereto.

EXAMPLES

Measurement Method:
[1] NMR Analysis:
An NMR analysis is performed by using a Bruker Avance III Ascend 500 MHz NMR spectrometer.
[2] IR Analysis:
An infrared ray (IR) spectroscopic analysis is performed by using Nicolet 5700 made by ThermoFisher Scientific.
[3] Measurement of Water Contact Angle:
A water contact angle is measured according to a manual standard measurement method of DSA 100 made by KRUSS GmbH (Hamburg, Germany).
[4] Measurement of Coefficient of Friction:
A coefficient of friction is measured according to a manual standard measurement method of FPT-F1 made by LAB-THINK Instruments Co., Ltd. (Jinan, China).

[5] Evaluation of Invisibility and Easy Removal:
An artificial sweat liquid is obtained by mixing oleic acid (6.1 percent by weight, wt %), squalene (17.1 wt %), triglycerides (29.3 wt %), and jojoba oil (47.5 wt %) and stamped on a surface of an organic layer.

The invisibility is determined by sliding the stamped artificial sweat under a predetermined pressure (e.g., 0.3 kilogram-force, kgf) and examining the same with a naked eye or an optical microscope to find out whether there is a track of the artificial sweat liquid.

The easy removal property is determined by sliding a cloth (a cotton fabric) under a predetermined pressure (e.g., 1.5 kgf) five times to wipe the stamped artificial sweat and examining the resulting product with a naked eye or an optical microscope to check whether there is a track of the artificial sweat liquid or not.

An irregular reflection measurement equipment is used according to a manual standard measurement method of SF 600 PLUS-CT made by Datacolor International (Luzern, Swiss).

Preparation Example 1

Figure 2:
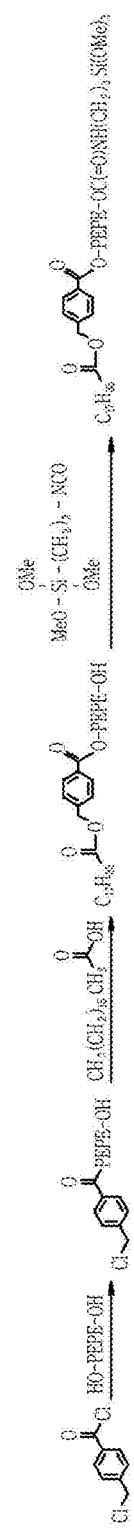
FIG. 2 schematically shows a preparation process of the PFPE compound according to Preparation Example 1.

A PFPE compound is prepared according to a synthesis scheme shown in FIG. 2 as follows:

[1] 0.5 millimoles (mmol) of Fluorolink D4000 (Solvay Specialty Polymers L.L.C.) and 1.5 mmol of triethylamine are charged into a 25 milliliters (mL) flask and dissolved in Novec 7200 (3M). The flask is placed in an ice-water bath, and the solution is stirred with a stirring bar. 129 milligrams (mg) of 4-(chloromethyl)benzoyl chloride is dissolved in dichloromethane, and the solution is added dropwise to the Fluorolink D4000 solution for a predetermined time. The obtained solution is allowed to react for 12 hours while maintained at 20° C. A solution obtained after removing a solid precipitate therein is washed with water and brine and subjected to rotary evaporation to remove a volatile material and then, vacuum-dried to obtain a transparent viscous liquid (PFPE having a first linker). A $^1$H-NMR analysis of the viscous liquid is performed, and the results are as follows: δ (Novec 7200) 7.8 ppm (2H), 7.2 ppm (2H), 4.6 ppm (2H), 4.3 ppm (2H), 3.8 ppm (2H) (wherein, ppm=parts per million).

[2] 404 mg of the obtained viscous liquid is placed in a 25 mL flask, 30.6 mg of stearic acid, 27 mg of $KHCO_3$, and DMAC of 1.3 g are added thereto, and the mixture is stirred and reacted under a nitrogen atmosphere at 65° C. for 60 hours. A white paste product therefrom is washed with distilled water, extracted by using Novec 7200, and dried with $MgSO_4$. A solution obtained after removing a solid material therefrom is subjected to rotary evaporation to remove a volatile material and obtain a light yellowish clear viscous liquid (PFPE having a first linker and a first end). A $^1$H-NMR analysis of the obtained viscous liquid is performed, and the results are as follows: δ (Novec 7200) 8.1 ppm (2H), 7.4 ppm (2H), 5.2 ppm (2H), 4.7 ppm (2H), 3.9 ppm (2H), 2.4 ppm (2H), 1.7 ppm (2H), 1.6 to 1.1 ppm (28H), 0.9 ppm (3H).

[3] A stirring bar is placed in a 20 mL vial, and 800 mg of the product, 42 mg of 3-isocyanatopropyltrimethoxysilane, and 2.4 g of Novec 7200 are placed therein and reacted for 20 hours while being stirred under a nitrogen atmosphere at 60° C. to obtain a PFPE compound having a first linker, a first end, a second linker, and a second end. A $^1$H-NMR analysis of the obtained PFPE compound is performed, and the results are as follows: δ (Novec 7200) 8.1 ppm (2H), 7.4 ppm (2H), 5.8 ppm (weak), 4.7 ppm (2H), 4.5 ppm (2H), 3.7 ppm (2H), 3.6 ppm (9H), 3.2 ppm (2H), 2.4 ppm (2H), 1.7 ppm (2H), 1.1 to 1.8 ppm (28H), 0.9 ppm (3H), 0.6 ppm (2H).

An IR analysis of the obtained PFPE compound is performed. The IR analysis result shows peaks due to an alkyl group and a carbonyl peak.

Preparation Example 2

A PFPE compound is prepared according to the substantially same method as Preparation Example 1, except for using 21.5 mg of decanoic acid instead of 30.6 mg of stearic acid. A $^1$H-NMR analysis of the PFPE compound is performed, and the results are obtained as follows:

δ (Novec 7200) 8.1 ppm (2H), 7.4 ppm (2H), 5.8 ppm (weak), 5.1 ppm (2H), 4.7 ppm (2H), 4.5 ppm (2H), 3.6 ppm (9H), 3.2 ppm (2H), 2.4 ppm (2H), 1.1 to 1.8 ppm (12H), 0.9 ppm (3H), 0.6 ppm (2H).

An IR analysis of the PFPE compound is performed. The results show peaks due to an alkyl group and a carbonyl peak.

Preparation Example 3

[1] 0.5 mmol of Fluorolink D4000 (Solvay Specialty Polymers L.L.C) and 1.5 mmol of triethylamine are placed in a 25 mL flask and dissolved in Novec 7200 (3M), the flask is placed in an ice-water bath, and the solution is then stirred with a stirring bar. Oleoyl chloride (0.5 mmol) is added to the Fluorolink D4000 solution by drops, and the mixture is heated up to 20° C. and reacted for 16 hours. A solution obtained after removing a solid precipitate therein is washed with water and brine and subjected to rotary evaporation to remove volatile materials therefrom and then, vacuum-dried to obtain a clear viscous liquid (PFPE having a first end). A $^1$H-NMR of the obtained viscous material is performed, and the results are obtained as follows: δ (Novec 7200) 6.8 ppm (br), 5.4 ppm (2H), 4.4 ppm (2H), 3.9 ppm (2H), 2.2 ppm (2H), 2.0 ppm (4H), 1.2 to 1.7 ppm (22H), 0.9 ppm (3H).

[2] A stirring bar is placed in a 20 mL vial, 240 mg of the obtained product and 16 mg of 3-isocyanatopropyltrimethoxysilane is dissolved in Novec 7200, and the solution is allowed to react under a nitrogen atmosphere at 60° C. for 20 hours. A PFPE compound having a first end and a second linker and a second end is obtained. A $^1$H-NMR analysis of the PFPE compound is performed, and the results are obtained as follows: δ (Novec 7200) 6.0 ppm (weak) 5.4 ppm (2H), 4.5 ppm (4H), 3.7 ppm (9H), 3.3 ppm (2H), 2.8 ppm (2H), 2.4 ppm (2H), 1.2 to 1.8 ppm (22H), 0.9 ppm (3H), 0.6 ppm (2H).

Preparation Example 4

[1] A clear viscous liquid (PFPE having a first end) is obtained according to the same method as described in Example 3, except for using 0.5 mmol of hexanoyl chloride instead of oleoyl chloride (0.5 mmol). A $^1$H-NMR analysis of the obtained viscous material is performed, and the results are obtained as follows: δ (Novec 7200) 6.5 ppm (br), 4.4 ppm (2H), 3.9 ppm (2H), 2.1 ppm (2H), 1.2 to 1.7 ppm (6H), 0.9 ppm (3H).

[2] A stirring bar is placed in a 20 mL vial, 170 mg of the obtained product and 16 mg of 3-isocyanatopropyltrimethoxysilane are dissolved in Novec 7200, and the solution is allowed to react for 20 hours while being stirred under a nitrogen atmosphere at 60° C. A PFPE compound having a first end and a second linker and a second end is obtained.

A $^1$H-NMR analysis of a PFPE compound is performed, and the results are obtained as follows: δ (Novec 7200) 6.1 ppm (weak) 4.5 ppm (4H), 3.7 ppm (9H), 3.3 ppm (2H), 2.8 ppm (2H), 2.4 ppm (2H), 1.2 to 1.8 ppm (8H), 0.9 ppm (3H), 0.6 ppm (2H).

Preparation Example 5

[1] A clear viscous liquid (PFPE having a first end) is obtained according to the same method as described in Example 3, except for using 0.5 mmol of lauroyl chloride instead of oleoyl chloride (0.5 mmol). A $^1$H-NMR analysis of the obtained viscous material is performed, and the following results are obtained: δ (Novec 7200) 6.1 ppm (br), 4.4 ppm (2H), 3.9 ppm (2H), 2.1 ppm (2H), 1.2 to 1.7 ppm (18H), 0.9 ppm (3H).

[2] A stirring bar is placed in a 20 mL vial, 160 mg of the obtained product and 16 mg of 3-isocyanatopropyltrimethoxysilane are dissolved in Novec 7200, and the solution is allowed to react for 20 hours while being stirred under a nitrogen atmosphere at 60° C. A PFPE compound having a first end and a second linker and a second end is obtained. A $^1$H-NMR analysis of the PFPE compound is performed, and the following results are obtained: δ (Novec 7200) 5.9 ppm (weak) 4.5 ppm (4H), 3.7 ppm (9H), 3.3 ppm (2H), 2.8 ppm (2H), 2.4 ppm (2H), 1.2 to 1.8 ppm (8H), 1.0 ppm (3H), 0.7 ppm (2H).

Preparation Example 6

Figure 3:
FIG. 3 schematically shows a preparation process of the PFPE compound according to Preparation Example 6.

A PFPE compound is prepared according to a synthesis scheme shown in FIG. 3 as follows.

[1] 0.25 mmol of Fluorolink D4000 (Solvay Specialty Polymers L.L.C.) and 1 equivalent of tin(II) 2-ethylhexanoate are placed in a 25 mL flask and then, stirred for 30 minutes at 80° C. Subsequently, 14 equivalent of ε-caprolactone is added thereto, and the obtained mixture is reacted at 80° C. for 40 hours. The obtained product is dissolved in dichloromethane, and 100 mL of methanol is added thereto to obtain a precipitate. A white solid obtained after stirred for 12 hours is filtered and vacuum-dried to obtain a viscous solid (PFPE having a first end and a second linker). A $^1$H-NMR analysis is performed by dissolving the obtained viscous solid in Novec 7200, and the following results are obtained: δ 4.1 ppm (2H), 2.4 ppm (2H), 1.7 ppm (4H), 1.3 ppm (2H).

[2] A stirring bar is placed in a 20 mL vial, 191 mg of the obtained product and 7 mg of 3-isocyanatopropyltrimethoxysilane are dissolved in Novec 7200, and the solution is allowed to react for 20 hours while being stirred under a nitrogen atmosphere at 60° C. A PFPE compound having a first end and a second linker and a second end is obtained. A $^1$H-NMR analysis of the obtained PFPE compound is performed, and the following results are obtained: δ (Novec 7200) 4.1 ppm (2H), 3.8 ppm (methoxy), 2.4 ppm (2H), 1.7 ppm (4H), 1.3 ppm (2H), 0.6 ppm (weak).

Example 1

[1] The obtained PFPE compound according to Preparation Example 1 is dissolved in Novec 7200 to obtain a composition having a concentration of 0.2 wt %. The composition is dip-coated on a glass substrate, dried for 15 minutes, and baked on a 150° C. hot plate for 15 minutes to obtain a layered structure having an organic layer on the glass substrate.

[2] A water contact angle, a coefficient of friction, and invisibility and easy-removal performances of the surface of the organic layer in the layered structure are measured, and the results are shown in Table 1. Referring to the results of Table 1, the layered structure according to Example may show an improved soft sense of touch as well as anti fingerprint properties and fingerprint invisibility and easy-removal performances.

Figure 4:
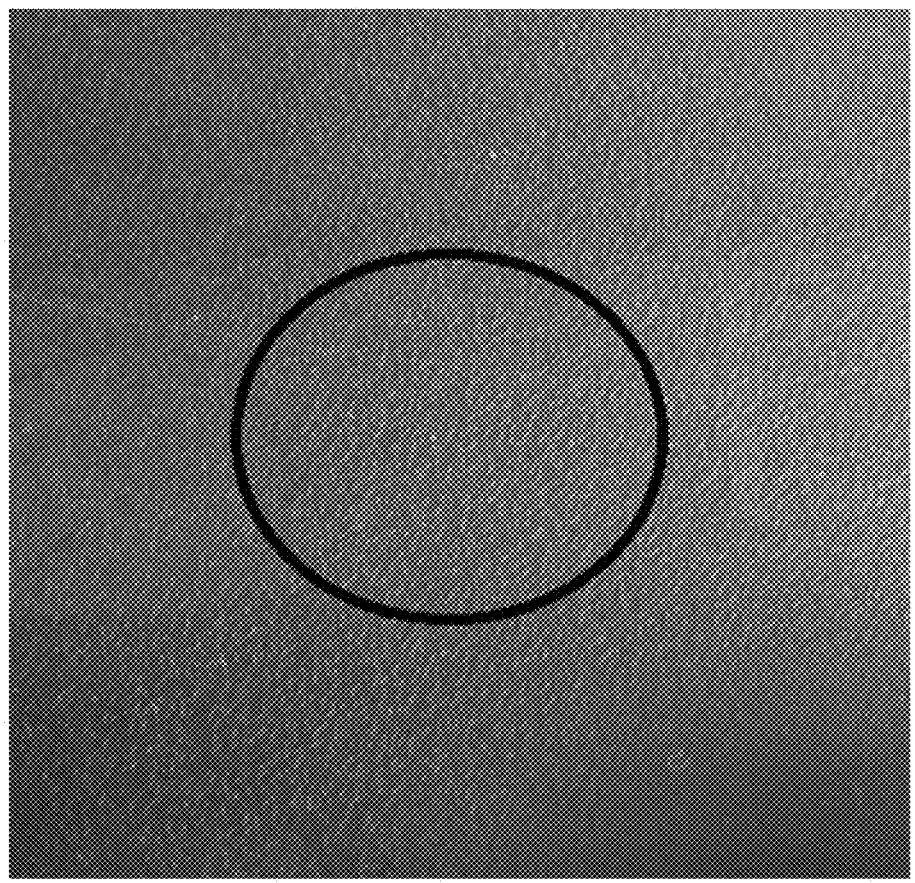
FIG. 4 is a view showing a fingerprint visibility test result of a layered structure including an organic layer formed from a composition according to Example 1.

[3] An artificial sweat liquid is stamped and slid, and thus, attached on the surface of the organic layer of the layered structure and then, analyzed with a microscope, and the results are shown in FIG. 4. Referring to the results of FIG. 4, the layered structure according to Example turns out to have fingerprint invisibility.

Comparative Example 1

[1] A layered structure is manufactured according to the same method as described in Example 1, except for using a commercially-available PFPE compound having the following structure instead of the PFPE compound according to Preparation Example 1:

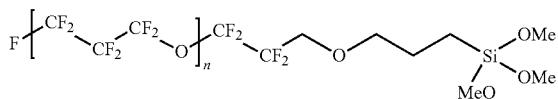

[2] A water contact angle and a coefficient of friction of the surface of the organic layer in the obtained layered structure are measured, and the results are shown in Table 1. Referring to the results of Table 1, the layered structure according to Comparative Example may show anti-fingerprint properties but relatively poor fingerprint invisibility and poor easy-removal performance compared with the organic layer according to Example 1.

TABLE 1

| | | Irregular reflection % | | |
|---|---|---|---|---|
| | Coefficient of friction | After slid (0.3 kgf) | After 5 times wiped with a cloth (1.5 kgf) | Water contact angle |
| Example 1 | 0.355 | 1.56 | 0.92 | 109.5 |
| Comparative Example 1 | 0.356 | 1.68 | 1.12 | 111 |

Figure 5A:
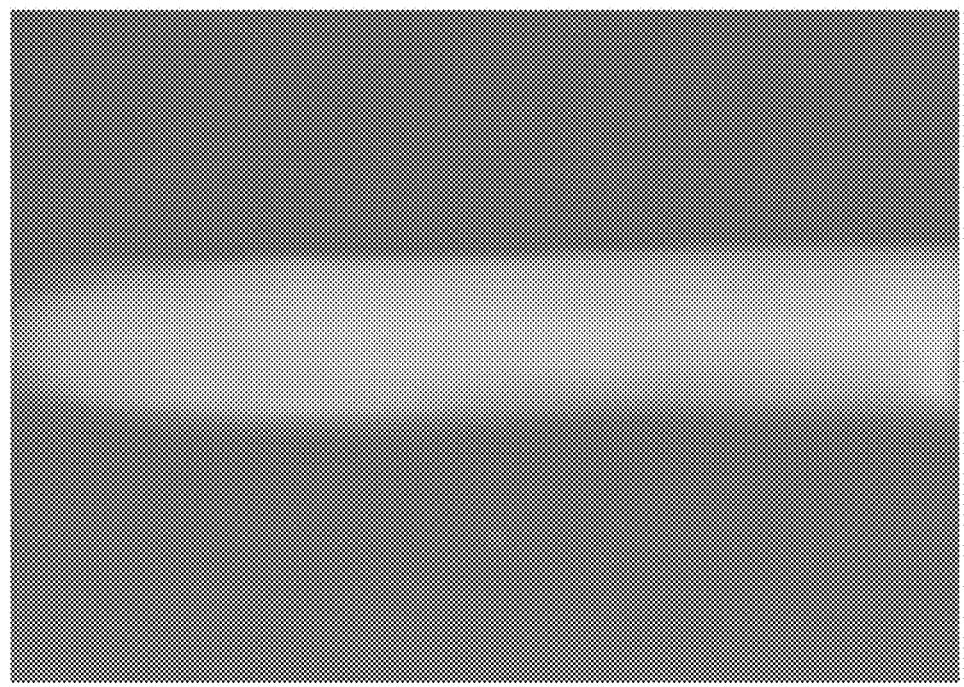
FIG. 5A is a view showing a fingerprint visibility test result of a layered structure including an organic layer formed from a composition according to Comparative Example 1.
Figure 5B:
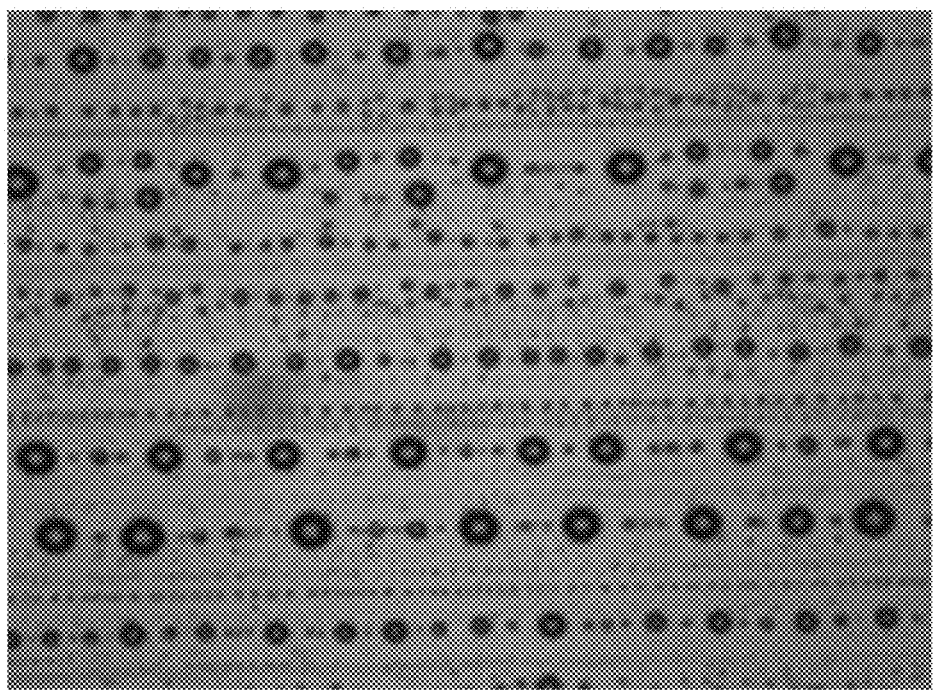
FIG. 5B is an optical microscopic image showing the fingerprint visibility test result of a layered structure including an organic layer formed from the composition according to Comparative Example 1.
Figure 5C:
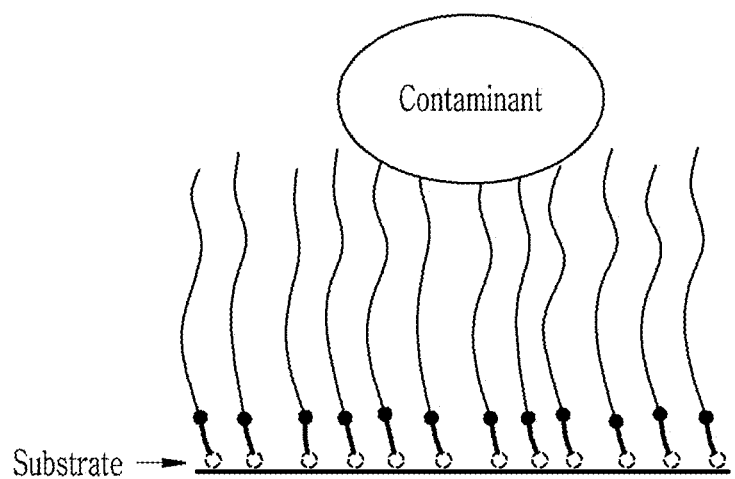
FIG. 5C is a schematic view showing a theoretical configuration of a compound in the organic layer of the layered structure according to Comparative Example 1.

[3] An artificial sweat liquid is stamped and slid, and thus, attached on the surface of the organic layer in the layered structure, and then, examined with a microscope, and the results are shown in FIG. 5A. The results of FIGS. 5A and 5B confirm that the layered structure according to Comparative Example does not have invisibility. Without wishing to be bound by any theory, it is believed that, as schematically shown in FIG. 5C, the structure of Comparative Example has a severe agglomeration of fingerprint contaminants, and thus, does not have fingerprint invisibility.

While this disclosure has been described in connection with what is presently considered to be practical exemplary embodiments, it is to be understood that the present description is not limited to the disclosed embodiments, but, on the contrary, is intended to cover various modifications and equivalent arrangements included within the spirit and scope of the appended claims.

What is claimed is:
1. A composition, comprising:
a perfluoropolyether compound; and
an organic solvent configured to dissolve or disperse the perfluoropolyether compound,
wherein the perfluoropolyether compound comprises a first end and a second end facing each other and a perfluoropolyether moiety disposed between the first end and the second end,
wherein the first end comprises an organic group comprising 5 or more carbon atoms, and does not include fluorine, and
the second end comprises a hydrolysable silicon-containing moiety,
wherein the organic group comprises a C5 to C60 substituted or unsubstituted aromatic hydrocarbon group, or a C6 to C60 substituted or unsubstituted aliphatic hydrocarbon group wherein at least one methylene is replaced by sulfonyl (—S(=O)$_2$—), carbonyl (—C(=O)—), sulfide (—S—), sulfoxide (—S(=O)—), ester (—C(=O)O—), amide (—C(=O)NR—) (wherein, R is hydrogen or a C1 to C10 linear or branch alkyl group), imine (—NR—) (wherein, R is hydrogen or a C1 to C10 linear or branch alkyl group), or a combination thereof, a substituted or unsubstituted poly(alkylene oxide) residual group, a substituted or unsubstituted polyester residual group, or a combination thereof.

2. The composition of claim 1, wherein the organic group is a C6 to C60 substituted or unsubstituted aryl group, a C7 to C60 substituted or unsubstituted arylalkyl group, a polyester moiety comprising a repeating unit represented by —RC(=O)O— (wherein, R is a C2 to C10 substituted or unsubstituted alkylene group), or a combination thereof.

3. The composition of claim 1, wherein the organic group does not comprise a polyurethane residual group.

4. The composition of claim 1, wherein the second end comprises —SiX$_3$ (wherein, X is the same or different and each independently comprises a C1 to C3 alkyl group, a C1 to C3 alkoxy group, a hydroxy group, Cl, or a combination thereof).

5. The composition of claim 1, wherein
the perfluoropolyether compound comprises a first linker between the first end and the perfluoropolyether moiety, and
the first linker comprise at least one moiety selected from a single bond, a C1 to C10 alkylene group, —O—, —C(=O), —C(=O)O—, —OC(=O)O—, —NHC(=O)O—, —OC(=O)NHS(=O)O—, —C(=O)NH— and —RC(=O)— (wherein, R is a C1 to C5 alkylene, a C6 to C20 arylene, or a combination thereof).

6. The composition of claim 5, wherein
the perfluoropolyether compound comprises a second linker between the second end and the perfluoropolyether moiety, and
the second linker comprises at least one moiety selected from a single bond, a C1 to C10 alkylene, —O—, —C(=O)—, —C(=O)O—, —OC(=O)O—, —NHC(=O)OR— (wherein, R is a C1 to C10 substituted or unsubstituted alkylene group), —C(=O)NH—, —OC(=O)NHS(=O)O—, and a polyester moiety comprising two or more repeating units represented by —RC(=O)O—(wherein, R is a C3 to C10 substituted or unsubstituted alkylene group).

7. The composition of claim 1, wherein the perfluoropolyether moiety comprises a repeating unit represented by Chemical Formula 1, a repeating unit represented by Chemical Formula 2, optionally a repeating unit represented by Chemical Formula 3, or a combination thereof:

$$*\!-\!(CR_2CF_2O)\!-\!* \quad \text{Chemical Formula 1}$$

wherein, R is the same or different and is each independently F or $CF_3$ and * is a portion linked to an adjacent atom in a main chain;

$$*\!-\!(CF_2O)\!-\!* \quad \text{Chemical Formula 2}$$

wherein, * is a portion linked to an adjacent atom in a main chain; and $$*\!-\!(CR_2)\!-\!* \quad \text{Chemical Formula 3}$$

wherein, R is the same or different and each independently is hydrogen, F, $CH_3$, or $CF_3$, and * is a portion linked to an adjacent atom in a main chain.

8. The composition of claim 1, wherein the perfluoropolyether compound has a weight average molecular weight of greater than or equal to about 500 Daltons and less than or equal to about 50,000 Daltons.

9. The composition of claim 1, wherein the perfluoropolyether compound comprises a compound represented by Chemical Formula 4:

$$R^1\!-\!L^1\!-\!PFPE\!-\!L^2\!-\!SiX_3 \quad \text{Chemical Formula 4}$$

wherein,
$R^1$ comprises a C6 to C60 substituted or unsubstituted aromatic hydrocarbon group, a C5 to C60 substituted or unsubstituted aliphatic hydrocarbon group wherein at least one methylene is replaced by sulfonyl (—S(=O)$_2$—), carbonyl (—C(=O)—), sulfide (—S—), sulfoxide (—S(=O)—), ester (—C(=O)O—), amide (—C(=O)NR—) (wherein, R is hydrogen or a C1 to C10 linear or branch alkyl group), imine (—NR—) (wherein, R is hydrogen or a C1 to C10 linear or branch alkyl group), or a combination thereof, a substituted or unsubstituted poly(alkylene oxide) residual group, a substituted or unsubstituted polyester residual group, or a combination thereof,
$L^1$ comprises a single bond, a C1 to C10 alkylene, —O—, —C(=O)—, —C(=O)O—, —OC(=O)O—, —NHC(=O)OR— (wherein, R is a C1 to C10 substituted or unsubstituted alkylene group), —OC(=O)NHS(=O)O—, —RC(=O)— (wherein, R is a C1 to C5 alkylene, a C6 to C20 arylene, or a combination thereof), —C(=O)NH—, or a combination thereof,
PFPE is a perfluoropolyether moiety,
$L^2$ comprises a single bond, a C1 to C10 alkylene, —O—, —C(=O)—, —C(=O)O—, —OC(=O)O—, —NHC(=O)OR— (wherein, R is a C1 to C10 substituted or unsubstituted alkylene group), —C(=O)NH—, —OC(=O)NHS(=O)O—, a polyester moiety comprising two or more repeating units represented by —RC(=O)O— (wherein, R is a C1 to C10 substituted or unsubstituted alkylene group), or a combination thereof, and
X is the same or different and each independently comprises a C1 to C3 alkyl group, a C1 to C3 alkoxy group, a hydroxy group, Cl, or a combination thereof.

10. The composition of claim 9, wherein the perfluoropolyether compound comprises a compound represented by Chemical Formula 4-1, a compound represented by Chemical Formula 4-2, a compound represented by Chemical Formula 4-3, or a combination thereof:

$$R\!-\!COO\!-\!PFPE\!-\!OCONH\!-\!(CR'_2)_n\!-\!SiX_3 \quad \text{Chemical Formula 4-1}$$

wherein,
R is a C5 to C60 substituted or unsubstituted alkyl group, a C5 to C60 substituted or unsubstituted alkenyl group, or a C5 to C60 substituted or unsubstituted alkyl group or alkenyl group wherein at least one methylene is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein, R is hydrogen or a C1 to C10 linear or branch alkyl group), imine (—NR—) (wherein, R is hydrogen or a C1 to C10 linear or branch alkyl group), or a combination thereof,
PFPE is a perfluoropolyether moiety,
R' is the same or different and each independently is hydrogen or a C1 to C3 alkyl group,
n is 1 to 10, and
X is the same or different and each independently comprises a C1 to C3 alkyl group, a C1 to C3 alkoxy group, a hydroxy group, Cl, or a combination thereof, $$R\!-\!COO\!-\!Ar\!-\!COO\!-\!PFPE\!-\!OCO\!-\!NH\!-\!(CR'_2)_n\!-\!SiX_3 \quad \text{Chemical Formula 4-2}$$

wherein,
R is a C5 to C60 substituted or unsubstituted alkyl group, a C5 to C60 substituted or unsubstituted alkenyl group, or a C5 to C60 substituted or unsubstituted alkyl group or alkenyl group wherein at least one methylene is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein, R is hydrogen or a C1 to C10 linear or branch alkyl group), imine (—NR—) (wherein, R is hydrogen or a C1 to C10 linear or branch alkyl group), or a combination thereof,
Ar is a substituted or unsubstituted phenylene or —(CR"$_2$)$_a$—Ph— (wherein, R" are independently hydrogen or a C1 to C3 alkyl group, Ph is a substituted or unsubstituted phenylene group, and a is 0 to 10),
PFPE is a perfluoropolyether moiety,
R' is the same or different and each independently is hydrogen or a C1 to C3 alkyl group,
n is 1 to 10, and
X is the same or different and each independently comprises a C1 to C3 alkyl group, a C1 to C3 alkoxy group, a hydroxy group, Cl, or a combination thereof, $$A\!-\!RCOO\!-\!PFPE\!-\!OCOR\!-\!OCO\!-\!NH\!-\!(CR'_2)_n\!-\!SiX_3 \quad \text{Chemical Formula 4-3}$$

wherein
A is a hydroxy group, hydrogen, or a C1 to C3 alkyl group,
R is a C5 to C10 alkylene group,
R' is the same or different and each independently is hydrogen or a C1 to C3 alkyl group,
n of $(CR')_n$ is 1 to 10, and
X is the same or different and each independently comprises a C1 to C3 alkyl group, a C1 to C3 alkoxy group, a hydroxy group, Cl, or a combination thereof.

11. The composition of claim 1, wherein the organic solvent comprises chlorinated hydrocarbon, fluorinated alkyl ether, fluorinated alkane, fluorinated alkene, fluorinated alkyl ester, fluorinated alkyl ketone, or a combination thereof.

12. The composition of claim 1, wherein the organic solvent comprises alkoxy fluoroalkane comprising 3 or more carbon atoms.

13. The composition of claim 1, wherein the composition has a moisture content of less than about 100 parts per million.

14. The composition of claim 1, wherein in the composition, a content of the perfluoropolyether compound is greater than or equal to about 0.001 percent by weight.

* * * * *